United States Patent [19]
Clack et al.

[11] 3,815,747
[45] June 11, 1974

[54] WATER SOFTENING SYSTEMS

[75] Inventors: Willis E. Clack; Clifford Kay; Charles E. Nygren, all of Madison, Wis.

[73] Assignee: Clack Corporation, Madison, Wis.

[22] Filed: May 26, 1972

[21] Appl. No.: 257,377

[52] U.S. Cl............ 210/140, 137/599.1, 210/191, 210/278, 210/288
[51] Int. Cl............................................ B01d 29/38
[58] Field of Search........... 210/24, 30, 32, 35, 134, 210/139, 140, 141, 142, 190, 191, 277, 278, 288; 137/599.1

[56] References Cited
UNITED STATES PATENTS
2,722,514  11/1955  Sloan.................................. 210/134
2,855,042  10/1958  Kryzer............................ 210/139 X
3,169,110  2/1965  Rudelick............................. 210/191

*Primary Examiner*—Charles N. Hart
*Assistant Examiner*—Ivars Cintins
*Attorney, Agent, or Firm*—John M. Winter; Theodore J. Long

[57] ABSTRACT

A method and apparatus for softening water in a single conditioning tank system. The water flow through the mineral bed in each service cycle is reversed from the last preceding service cycle and the water-brine solution flow through the mineral bed in each regeneration cycle is reversed from the last preceding regeneration cycle. That is, a downflow service cycle through the mineral bed is followed by an upflow regeneration cycle, an upflow service cycle and a downflow regeneration cycle.

2 Claims, 6 Drawing Figures

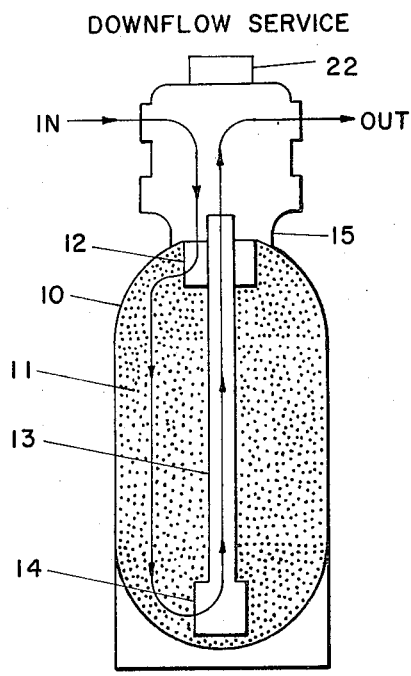
Fig.1 DOWNFLOW SERVICE
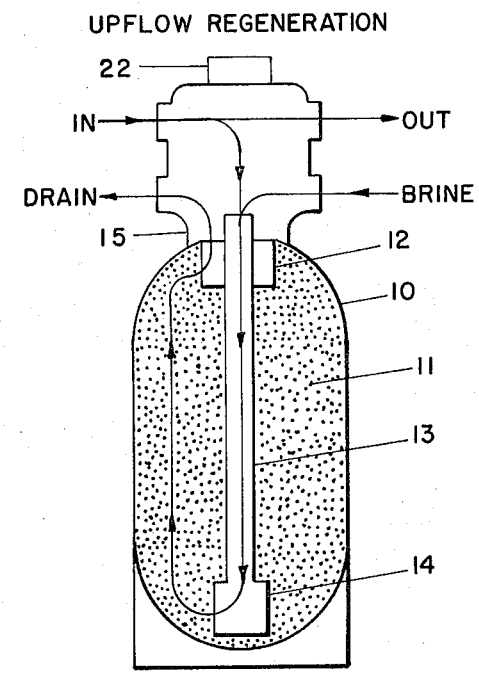
Fig.2 UPFLOW REGENERATION
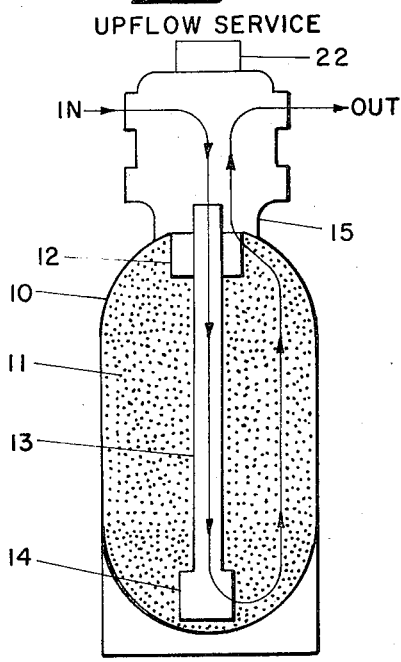
Fig.3 UPFLOW SERVICE
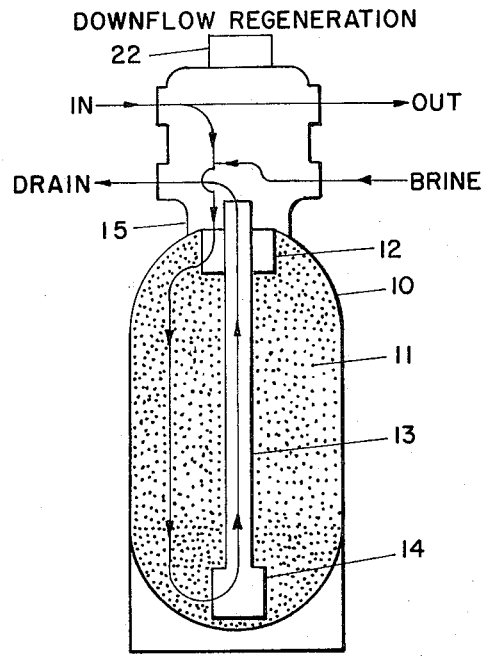
Fig.4 DOWNFLOW REGENERATION

WATER SOFTENING SYSTEMS

The system comprises a single conditioning tank, a mineral bed in the tank, a distributor in the top of the tank, a riser pipe, a distributor in communication with the riser pipe in the bottom of the tank, and new valve apparatus having a pair of two-position valve members for carrying out the unique method.

BACKGROUND OF THE INVENTION

This invention relates to water conditioning systems and more particularly to a method and apparatus for softening water in a single conditioning tank system wherein the water flow pattern in each successive service cycle is reversed as is the water-brine solution flow in each successive regeneration cycle.

In the past, single-tank water softening systems have typically had a unidirectional flow pattern during successive service cycles, that is, the water flow has been in the same direction through the mineral bed during each successive softening or service cycle. Likewise, the flow through the mineral bed during successive regeneration cycles has been in the same direction.

Downflow-service water softening units have generally been more efficient as to the quality of the softened water. Water softener manufacturers who have designed upflow-service units, without compressed mineral beds, have found them to be less efficient as to the quality of softened water. The use of a compressed mineral bed has tended to improve the water softening quality in upflow-service systems.

A method of reversing the flow direction during successive service cycles in a twin-tank system is disclosed in U.S. Pat. No. 1,903,958, however, to our knowledge such a method has not been practiced in a single-tank system.

SUMMARY OF THE INVENTION

Basically, our invention resides in a method and apparatus in a single-tank water softening system for reversing the direction of water flow through the mineral bed in each successive service cycle and for likewise reversing the flow through the mineral bed in each successive regeneration cycle.

Iron and sediment are two main factors in fouling the mineral bed in water softening systems. Normally, it is not practical to run backwash water quantities equal to service quantities in order to maintain a clean bed in known single-tank softening systems. Our design facilitates maintaining a clean operational mineral bed in a single-tank system without wasting water in that water flow during successive service cycles is substantially equal in each direction. Our system eliminates the normal back-washing phase of a single-tank system.

Further, our system, particularly with a compressed mineral bed, gives an equal quality of treated water regardless of the direction of water flow during the service cycle.

Additional objects, features and advantages of our invention will be apparent from the following detailed description taken in conjunction with the accompanying drawings showing a preferred embodiment of the invention for exemplification.

BRIEF DESCRIPTION OF THE DRAWINGS

FIG. 1 is a schematic drawing showing our water softening system in a downflow service cycle.

FIG. 2 is a schematic drawing showing our system in an upflow regeneration cycle.

FIG. 3 is a schematic drawing showing our system in an upflow service cycle.

FIG. 4 is a schematic drawing showing our system in a downflow regeneration cycle.

DESCRIPTION OF A PREFERRED EMBODIMENT

Figure 5:
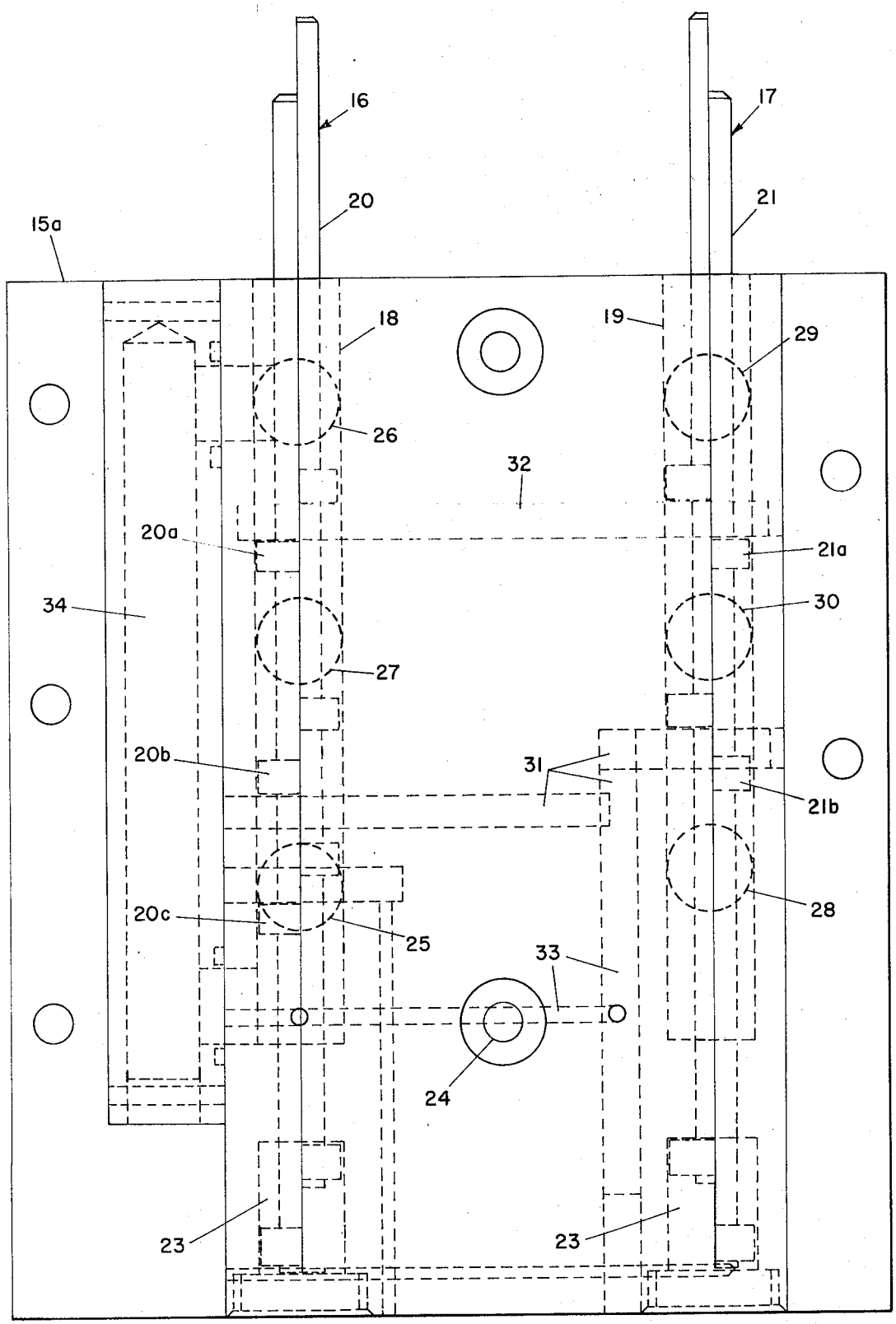
FIG. 5 is a plan view of the head of the control valve of our system with split valve members depicting the various valve positions.

Referring now more particularly to the drawings wherein like numerals refer to like parts throughout the several views, our system and method is schematically depicted in FIGS. 1-4. As shown therein, the system generally comprises a single water softening tank 10, a mineral bed 11, a distributor 12 in the top of the tank, a riser pipe 13, and a distributor 14 in open communication with the riser pipe in the bottom of the tank, and control valve means 15.

Figure 6:
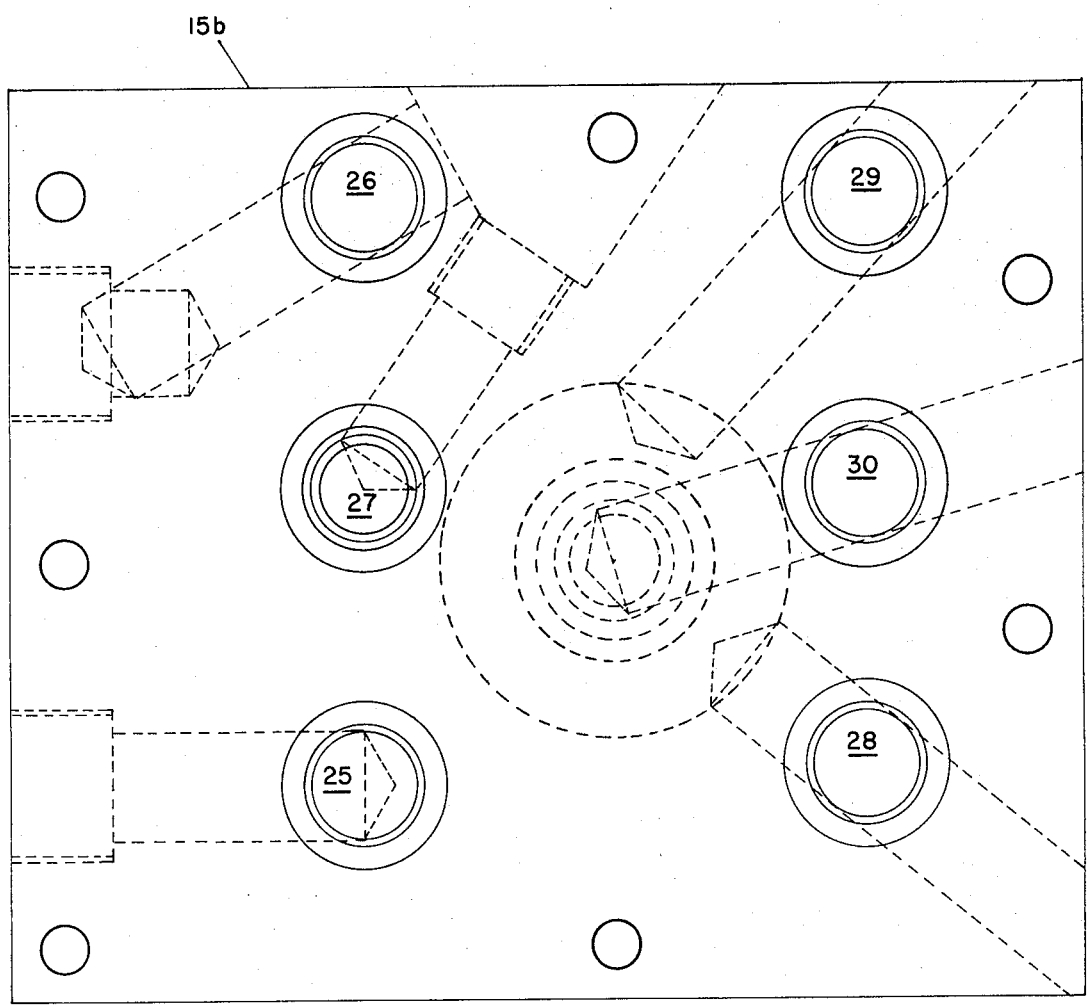
FIG. 6 is a plan view of the base of the control valve of our system showing the various valve ports.

As shown in FIGS. 5 and 6 the control valve has a valve head 15a and a mating valve base 15b. The valve has a pair of valve members 16 and 17 mounted for reciprocal movement in twin bores 18 and 19, respectively, in the valve head. The valve members comprise stems 20 and 21 and valve closures 20a, 20b and 20c; and 21a and 21b, respectively.

The valve members are controlled by a timed valve operator of known construction, schematically depicted in FIGS. 1-4 at 22. The valve may include line pressure assist mechanism 23 in FIG. 5 such as is fully described in our U.S. Pat. No. 3,578,167.

The valve has a brine injector port 24 formed in the valve head between the twin bores 18 and 19.

An inlet 25 is formed in the valve head and base in open communication with bore 18 for supplying raw water to tank 10 for softening and to brine port 24 for forming a water-brine solution for regenerating the mineral bed. An outlet 26 is provided for supplying softened water to service. A drain port 27 is provided for discharging water-brine solution from the system.

The valve 15 has a first distributor port 28 in open communication with the top distributor 12 for supplying raw water and water-brine solution to the top of the conditioning tank 10. A second distributor port 29 is also provided in open communication with top distributor 12 for supplying softened water from the top distributor 12 to outlet 26 and water-brine solution from the top distributor 12 to the drain port 27. A riser port 30 is formed in the valve head and base in open communication with the top of riser pipe 13 for supplying raw water and water-brine solution to the riser pipe 13 and for supplying softened water from the riser pipe 13 to outlet 26 and further for supplying water-brine solution from the riser pipe 13 to the drain port 27.

A first passageway 31 is formed in the valve head between bores 18 and 19 for connecting inlet 25 to the first distributor port 28 and the riser port 30. A second passageway 32 is formed in the valve head between bores 18 and 19 for connecting outlet 26 to riser port 30 and to the second distributor port 29 and for connecting drain port 27 to riser port 30 and to the second distributor port 29. A third passageway 33 is formed in the valve head between bore 18 and first passageway 31 for connecting inlet 25 to brine port 24, riser port 30 and first distributor port 28.

Valve member 16 is reciprocal between a service position illustrated by the left half of the member in FIG. 5 and a regeneration position illustrated by the right half of the member. Bore 18 in which valve member 16 operates communicates with inlet 25, outlet 26, and drain port 27. As shown in FIG. 5, valve closure 20a operates in bore 18 on either side of valve passageway 32 for alternately connecting passageway 32 with outlet 26 and drain port 27. Valve closure 20b is positioned on the valve stem 20 for maintaining bore 18 closed between drain port 27 and valve passageway 31. Valve closure 20c operates in bore 18 on either side of inlet 25 for alternately connecting the inlet with valve passageway 31 and valve passageway 33.

Valve member 17 is reciprocal between a downflow-service-downflow-regeneration position illustrated by the left half of the member in FIG. 5 and an upflow-service upflow-regeneration position illustrated by the right half of the member. Bore 19 in which valve member 17 operates communicates with first and second distributor ports 28 and 29 and riser port 30. As shown in FIG. 5, valve closure 20a operates in bore 19 on either side of valve passageway 32 for alternately connecting passageway 32 with distributor port 29 and riser port 30. Valve closure 21b operates in bore 19 on either side of valve passageway 31 for alternately connecting passageway 31 with distributor port 28 and riser port 30.

As shown in FIG. 5 a raw water by-pass 34 connects inlet 25 with outlet 26 via bore 18 for supplying raw water for service during each regeneration cycle.

The method of operation through four successive cycles (1) downflow service, (2) upflow regeneration, (3) upflow service, and (4) downflow regeneration will now be described.

1. Downflow Service — The downflow service cycle is schematically depicted in FIG. 1. Valve member 16 is in the lower position illustrated by the left half of valve member 16 in FIG. 5 and valve member 17 is in the upper position illustrated by the left half of the member. When the valve members 16 and 17 are in their illustrated positions for downflow service, raw water enters inlet 25 and passes to the top distributor 12 via bore 18, passageway 31, bore 19 and distributor port 28. The water is distributed through distributor 12 to the top of the mineral bed 11 and is softened as it filters downwardly through the bed. The softened water passes in through the bottom distributor 14 and flows up the riser pipe 13 and then through the control valve to service via riser port 30, bore 19, passageway 32, bore 18, and outlet 26.

2. Upflow Regeneration — The upflow regeneration cycle is schematically depicted in FIG. 2. Valve member 16 is in the upper position illustrated by the right half of the member in FIG. 5 and valve member 17 is in the lower position illustrated by the right half of the member. When the valve members 16 and 17 are in their illustrated positions for upflow regeneration, raw water entering inlet 25 is bypassed to the outlet 26 for service via bypass 34. In addition, some of the water entering inlet 25 passes through bore 18, and passageway 33 wherein brine is injected through brine injector port 24. The resulting water-brine solution passes via passages 33 and 31 to bore 19 and riser port 30. The water-brine solution then passes downwardly through riser pipe 13 and is distributed by distributor 14 to the bottom of the mineral bed 11. The water-brine solution flows upwardly through the mineral bed to regenerate the bed and passes in through distributor 12 at the top of the tank and then through distributor port 29, bore 19, passageway 32, bore 18 and out drain port 27.

3. Upflow Service — The upflow service cycle is schematically depicted in FIG. 3. The valve member 16 is in the lower position illustrated by the left half of the member in FIG. 5 and valve member 17 is in the lower position illustrated by the right half of the member. When the valve members 16 and 17 are in these illustrated positions for upflow service, raw water enters inlet 25 and passes to the top of the riser pipe 13 via bore 18, passage 31, bore 19 and riser port 30. The raw water passes down the riser pipe and is distributed through distributor 14 to the mineral bed 11 at the bottom of the tank. The water is softened as it filters upwardly through the mineral bed. The softened water enters the distributor 12 at the top of the tank and then passes through the control valve to service via distributor port 29, bore 19, passageway 32, bore 18 and outlet 26.

4. Downflow Regeneration — The downflow regeneration cycle is schematically depicted in FIG. 4. The valve member 16 is in the upper position illustrated by the right half of the member in FIG. 5 and valve member 17 is in the upper position illustrated by the left half of the member. When the valve members 16 and 17 are in their illustrated positions for downflow regeneration, raw water from inlet 25 is bypassed to outlet 26 for service via bypass 34. In addition, raw water entering inlet 25 flows through bore 18 and passageway 33 wherein brine is injected through brine injector port 24. The resulting water-brine solution flows via passageway 33, passageway 31, bore 19 and distributor port 28 to distributor 12 at the top of the tank. The water-brine solution is distributed by distributor 12 to the top of the mineral bed 11. The water-brine solution then filters downwardly regenerating the mineral bed to the bottom of the tank where it passes in through distributor 14 and flows upwardly through riser pipe 13 and then through control valve to a drain via riser port 30, bore 19, passageway 32, bore 18, and drain port 27.

It should be understood that our invention is not confined to the particular construction, arrangement of parts and steps herein illustrated and described, but embraces all such modifications thereof as fall within the scope of the following claims.

We claim:

1. Water softening apparatus comprising:
   a. a single conditioning tank,
   b. a mineral bed in said tank,
   c. a distributor in the top of said tank
   d. a riser pipe in said tank,
   e. a distributor connected to said riser pipe in the bottom of said tank,
   f. a valve mounted on said tank,
   g. a brine injector port in said valve, h. an inlet in said valve for supplying raw water to said tank for conditioning and to said brine injector port for forming a waterbrine solution,
i. an outlet in said valve for supplying water for service from said apparatus,
j. a drain port in said valve for discharging waterbrine solution from said apparatus,
k. a first distributor port in said valve for supplying raw water and water-brine solution to said top distributor,
l. a second distributor port in said valve for supplying conditioned water from said top distributor to said outlet and water-brine solution from said top distributor to said drain port,
m. a riser port in said valve for supplying raw water and water-brine solution to said riser pipe, for supplying conditioned water from said riser pipe to said outlet, and for supplying water-brine solution from said riser pipe to said drain port,
n. a first passageway in said valve for connecting said inlet to said first distributor port and said riser port,
o. a second passageway in said valve for connecting said outlet to said riser port and to said second distributor port and said drain port to said riser port and to said second distributor port,
p. a third passageway in said valve for connecting said inlet to said brine port, said riser port and said first distributor port,
q. a first valve member being reciprocal between a service position and a regeneration position in a first valve bore which is in communication with said outlet, drain port and inlet, said first valve member having,
  1. a first valve closure movable within said first valve bore from one side of said second passageway to the other side thereof,
  2. a second valve closure located within said first valve bore between said drain port and said first passageway, and
  3. a third valve closure movable within said first valve bore from one side of said inlet to the other side of said inlet, and
r. a second valve member being reciprocal between a downflow service and downflow regeneration position and an upflow service and upflow regeneration position in a second valve bore which is in communication with said first and second distributor ports and said riser port, said second valve member having,
  1. a first valve closure movable within said second valve bore from one side of said second passageway to the other side thereof, and
  2. a second valve closure movable within said second valve bore from one side of said first passageway to the other side thereof.

2. A valve as specified in claim 1 having a raw water by-pass connecting said inlet with said outlet for supplying raw water to service during each regeneration cycle.

* * * * *